US005398286A

United States Patent [19]

Balestri et al.

[11] Patent Number: 5,398,286

[45] Date of Patent: Mar. 14, 1995

[54] SYSTEM FOR ENHANCING AN ANALOG SIGNAL

[75] Inventors: Robert Balestri, Frederick, Md.; W. Foster Rich, Arlington; Stephen M. L. Eng, Vienna, both of Va.; Robert B. Lezec, Jove-les-Tours, France; Joseph P. Pagliuca, Laurel, Md.

[73] Assignee: Booz-Allen & Hamilton, Inc., McLean, Va.

[21] Appl. No.: 87,700

[22] PCT Filed: Jan. 11, 1991

[86] PCT No.: PCT/US91/00044

§ 371 Date: Jul. 9, 1993

§ 102(e) Date: Jul. 9, 1993

[51] Int. Cl.[6] .... H04B 15/00

[52] U.S. Cl. .... 381/94

[58] Field of Search .... 381/71, 94, 47, 98, 381/63

[56] References Cited

U.S. PATENT DOCUMENTS

| | | | |
|---|---|---|---|
| 3,183,304 | 5/1965 | Schroeder | 381/83 |
| 4,672,674 | 6/1987 | Clough et al. | 381/71 |
| 4,683,590 | 7/1987 | Miyoshi et al. | 381/71 |
| 4,689,821 | 8/1987 | Salikuddin et al. | 381/71 |
| 4,980,914 | 12/1990 | Kunungi et al. | 381/1 |

*Primary Examiner*—Forester W. Isen

*Attorney, Agent, or Firm*—Burns, Doane, Swecker & Mathis

[57] ABSTRACT

A system for enhancing an analog signal by eliminating undesired portions of a detected signal, such as incoherent, background noise is disclosed. A detected input signal is divided into two paths ($P_1$ and $P_2$), each path having a high pass filter (50, 52) for removing low frequency noise components beneath the frequency band of the desired portion of the input signal. One signal path ($P_2$) is delayed by a predetermined time delay (54) and summed in a summer (56) with the other signal path ($P_1$). By shifting and summing the two path signals, the desired signal is enhanced in a number of ways. First, the incoherent, undesired portions of the detected signal within the frequency band may be significantly attenuated or cancelled. Second, the gain of the desired portion of the detected signal is increased. Third, the quality of the desired signal is improved with the addition of a reverberation component. A low pass filter (58) is used to remove any residual signals above the voice band.

17 Claims, 13 Drawing Sheets

SYSTEM FOR ENHANCING AN ANALOG SIGNAL

FIELD OF INVENTION

The present invention relates generally to a system for enhancing analog signals in real time.

BACKGROUND OF THE INVENTION

In many environments, it is desirable, in fact necessary, to reduce the amplitude of noise, vibrations, and/or other interfering signals. The prior art has attempted to accomplish this reduction using a variety of techniques, both passive and active.

Passive reduction or attenuation is generally accomplished by disposing one or more layers of barrier, absorbing, and/or damping materials between the source of the noise or vibration and the area where a reduced or attenuated noise level is desired. While effective in some situations, passive attenuation systems are often unsuitable for applications where size, weight, and/or cost considerations prevent the use of attenuating materials.

Other prior art techniques have focussed on active signal reduction techniques such as Active Noise Cancellation (ANC). Active Noise Cancellation has received a considerable amount of interest in a variety of signal cancellation applications, e.g., air ducts, exhaust fans, zonal quieting, head phones, vibration cancellation in structures, and echo cancellation in electronic signal communications. The active reduction of sound waves in the audible range is performed by processing the electrical cancellation signals at a rate greater than the rate of propagation of those sound waves in a particular propagation medium. In the time it takes for a sound wave to propagate from a location where the sound is measured to a second location where it may be cancelled, there is time to sample the sound wave signal, process that information in a processing circuit, and produce a signal to drive an actuator to introduce a cancelling signal 180° out-of-phase and equal in amplitude to the propagating sound wave.

The function block diagram shown in FIG. 1(*a*) is useful in explaining basic principles of active noise cancellation systems or vibration cancellation systems. A noise or vibrational disturbance 10 is detected by a suitable sensor 12. The sensor 12 converts the noise or vibration 10 into an electrical signal which is processed in some fashion in a controller 14. The controller 14 determines a cancellation signal, typically the inverse of the sensed noise or vibration signal, and uses this cancellation signal to drive an actuator 16. In the case of acoustic noise, the actuator 16 is simply a speaker. If the cancellation is appropriately timed, the original noise signal is cancelled by an output signal generated by the actuator 16. This cancellation is represented mathematically as a summation of the sensed and cancellation signals at a summer 18.

A graphic depiction of the cancellation process is provided in FIG. 1(*b*). The noise signal represented by a waveform signal "a" is essentially cancelled by another waveform signal "b" of equal amplitude but having a phase difference of 180°. The sum of these two waveforms leaves only a residual signal "c".

Systems for actively cancelling repetitive noise and vibration have been proposed for example in Chaplin, U.S. Pat. Nos. 4,153,815; 4,490,841 and 4,654,871; as well as Warnaka et al, U.S. Pat. No. 4,562,589; and Ziegler, Jr., U.S Pat. No. 4,878,188.

In U.S. Pat. Nos. 4,153,815 and 4,654,871, Chaplin describes the use of a synchronizing timing generator to provide cancellation of a repetitive noise. Initially, a noise or vibration signal is detected and analyzed so that a cancelling signal waveform can be generated. Once the cancelling waveform has been determined, a controller and pulse generators attempt to synchronize the timing of the cancellation signal so that the noise or vibration is cancelled. Any remaining noise is fed back to the controller as an error signal. The noise signal is divided into multiple intervals, and the amplitude of the cancelling signal is adjusted in each interval in response to the sign or amplitude of the error signal.

In U.S. Pat. No. 4,490,841, Chaplin describes the use of Fourier transforms to process signals in the frequency domain. In this system, repetitive noise or vibration signals are cancelled by individually synchronizing the output of different frequency components of the cancelling signal based on a repetition rate sensed at the noise source. Fourier transforms are used to identify and quantify the discrete frequency components that contribute most significantly to the noise signal. These discrete frequency components are modified separately in order to adapt the cancelling waveform to the detected noise signals. The modified frequency components are inverse Fourier transformed back into the time domain to produce a cancellation signal for an output actuator.

The use of adaptive filters to accelerate the adaptation of active noise cancellation systems is suggested for example by Warnaka in U.S. Pat. No. 4,562,589. Widrow et al., in "Adaptive Noise Cancelling Principles and Applications," Proceedings of IEEE, Vol. 63, No. 12, 12/75, pp. 1692–1716, uses a multiple weight, adaptive finite impulse response (FIR) filter to actively cancel noise signals. A previously determined, reference noise signal is used to tune or adapt the coefficients of the adaptive filter. The output signal from the filter is subtracted from the actual noise signal. Any detected residual noise or error is fed back to adjust the filter coefficients. A requirement of the Widrow system is that the reference signal be within 90° in-phase of the error signal.

A variation of the adaptive filter of the Widrow model is disclosed in the Ziegler, Jr. U.S. Pat. No. 4,878,188. The adaptive filtering system includes for each frequency to be cancelled, a sine and cosine generator, responsive to a timing/synchronizing signal, for providing inputs to two adaptive filters whose outputs are summed to provide a cancellation signal.

A particular application of noise cancellation is found in audio headphones or headsets, as disclosed, for example, in U.S. Pat. Nos. 4,455,675 Bose et al. and 4,494,074 to Bose. In these patents, a microphone is located in a small cavity in the headphones between the diaphragm and the ear canal adjacent to the diaphragm. The microphone generates a feedback signal that is combined with the input electrical signal to the headphones. The feedback signal corresponds to the sum of ambient acoustic noise and the sound produced by the headphone driver in that cavity. The sum of the feedback signal and the audio signal provides an error signal which is used to generate a compensation signal.

Unfortunately, the prior art signal cancelling/reduction systems are complex, relatively slow, and inflexible. For example, many of the systems described above process signals in the frequency domain. As a result, three Fourier transformations must be calculated for each waveform: a first conversion of the detected signal into the frequency domain, a second conversion of the detected residual noise into the frequency domain, and a third conversion of the cancellation signal back into the time. domain. Obviously, the computational time required to calculate these transformations is considerable.

Another deficiency of the prior art is the limited ability to adapt quickly to or predict changes in the character of the noise waveform. Undue reliance is placed on the assumption that the signal to be cancelled can be characterized as periodic or repetitive in nature. Thus, only those repetitive noises or vibrations that can be characterized and/or analyzed before the cancellation process begins, e.g., by using a reference or model noise signal, can be cancelled. Many of the prior art systems require timing and synchronization signals in order to accomplish noise cancellation. A periodic and/or random signals that cannot be predicted ahead of time cannot be cancelled effectively. A periodic signals are signals that do not repeat themselves at fixed intervals, but occur in unknown time and space intervals, e.g., a signal that has a random, time varying character.

Moreover, the prior art systems restrict their signal analysis either to a limited number of discrete periodic frequency components or to limited frequency bandwidths of the signal to be cancelled. This assumption is not acceptable in situations where the noise or vibration signals are not known in advance, where the frequency components of those signals vary over time, or where the frequencies of interest exceed the operating bandwidths of those systems.

One of the difficulties in cancelling noise or any other type of undesired signal is accurately characterizing that noise. Within the specific frequency band of the desired signal, there are noise components that are extremely difficult to isolate or to accurately predict given the random nature of some types of noise signals. For example, environmental noise such as wind, is random and is difficult to effectively predict, model, or isolate.

The difficulty encountered in cancelling random noise also presents a problem in the broader context of signal enhancement. Signal enhancement refers generally to improving the distinguishability of a desired signal in a received signal by increasing the signal-to-noise ratio and improving the quality of the desired signal. If random noise is present, the gain and/or quality of a desired signal can only be improved to limited extent. For example, increasing the signal gain increases not only the gain of the desired signal but also the gain of the random noise. Thus, signal enhancement ultimately requires that the received signal be filtered in some way to remove undesired, random noise components.

Accordingly, there is a need for a simplified signal processing system that enhances a signal in the process of quickly and accurately filtering undesired, unpredictable signals from a desired frequency band. Moreover, when applying such a signal enhancement procedure to active noise cancellation, there is a need for a signal processing system that effectively characterizes and isolates the undesired, unpredictable signal components in the frequency band of the desired signal and actively cancels those undesired signals.

SUMMARY OF THE INVENTION

A system for enhancing an analog signal by eliminating undesired portions of a detected signal, such as incoherent, background noise. The detected signal is divided into two paths, each path having a high pass filter for removing low frequency noise components beneath the frequency band of the desired portion of the signal. One signal path is delayed by a predetermined time delay and then summed with the other signal path. The summing procedure essentially performs an autocorrelation of the signal. By summing the two path signals slightly out of phase, the signal is enhanced in a number of ways. First, the incoherent, undesired portions of the detected signal are significantly attenuated depending on the length of the time delay. Second, the gain of the desired portion of the detected signal is increased. Third, the quality of the desired signal is improved with the addition of a reverberation component. For certain time delay values, the time delay and summing procedure essentially differentiates the signal causing the attenuated, incoherent noise signals to be shifted to higher frequencies beyond the frequency band of the desired signal. A low pass filter removes the residual high frequency signal components above the frequency band of interest leaving only the enhanced, desired signal.

In the context of active noise cancellation, the enhanced analog signal is inverted 180° out-of-phase with the detected signal and summed with the originally input signal. The signal resulting from that summation represents the undesired portion of the signal. Having been isolated, that undesired signal is also inverted and used to drive an output transducer to cancel the undesired portion of the signal from a particular environment, e.g., a set of headphones, etc.

BRIEF DESCRIPTION OF THE DRAWINGS

These and other features and advantages of the invention will be readily apparent to one of ordinary skill in the art from the following written description, read in conjunction with the drawings, in which:

FIG. 1(*b*) is a graphic illustration of the prior art active noise cancellation process in accordance with the system of FIG. 1(*a*);

DETAILED DESCRIPTION OF THE PREFERRED EMBODIMENTS

Figure 1A:
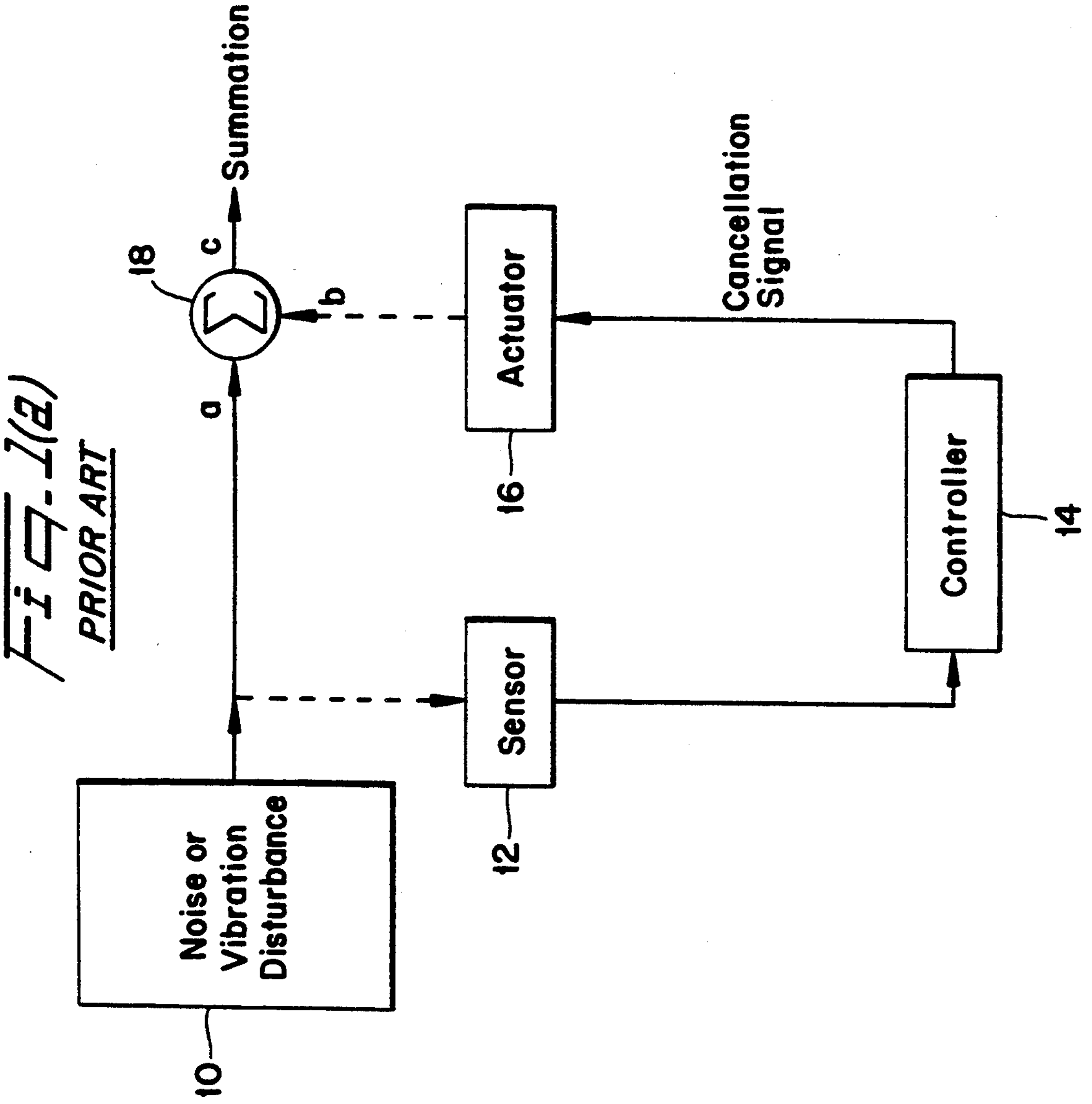
FIG. 1(a) PRIOR ART
FIG. 1(*a*) is a general schematic representation of a prior art active noise cancellation system.
Figure 1B:
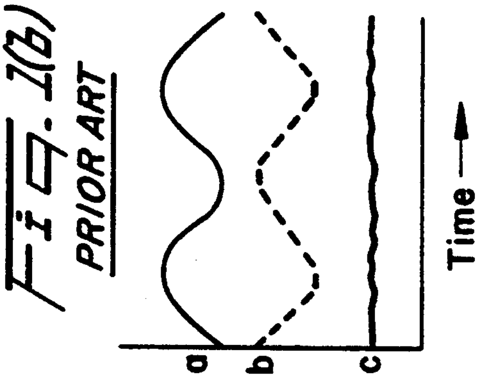
FIG. 1(b) PRIOR ART
Figure 2:
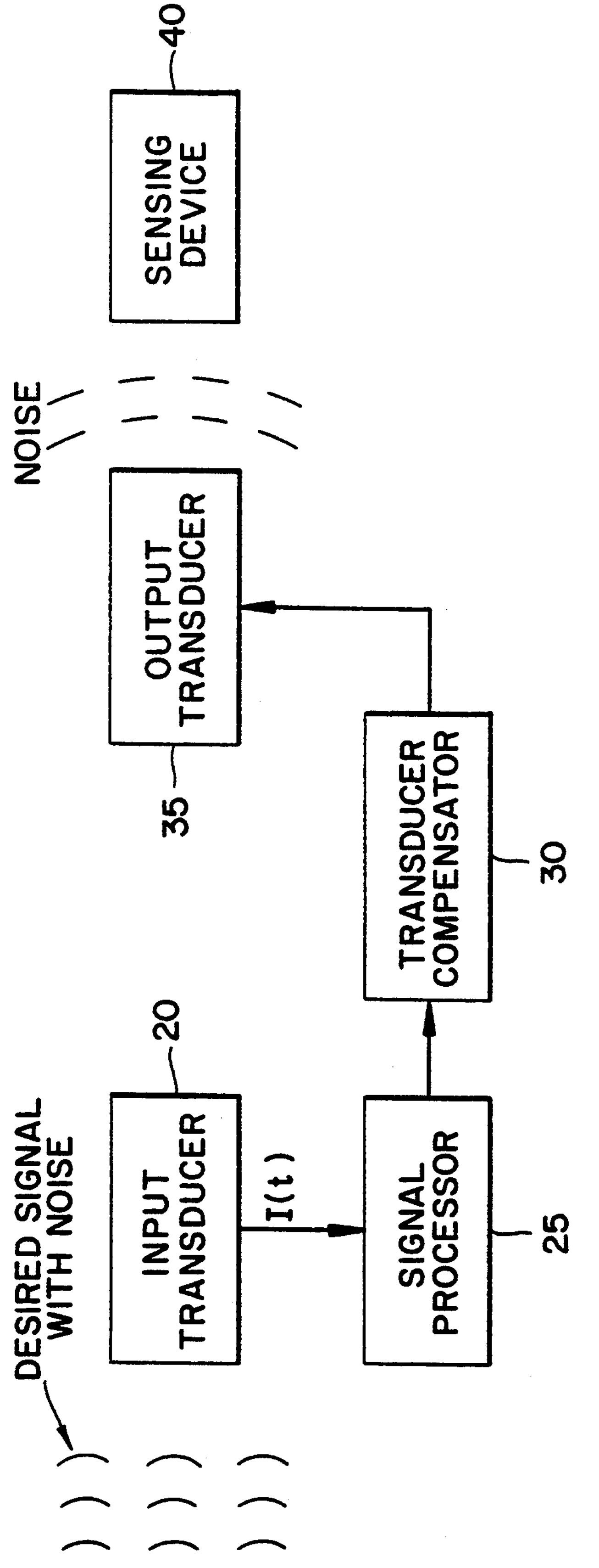
FIG. 2 is a schematic view of a system for enhancing a detected signal in accordance with the present invention.

A preferred embodiment of the present invention is shown in the general schematic of FIG. 2. Although the present invention is described in the context of signal isolation and cancellation, it will be appreciated that specific applications of the present invention are not limited to the cancellation of noise or vibration signals. Rather, the present invention is applicable to any situation where it is desirable to characterize and enhance a time varying signal.

Initially, a transducer 20 is used to detect an input signal I(t) and convert it to a measurable electrical signal. The transducer 20 might be, for example, a microphone, an antenna, an accelerometer, a pressure sensor, a piezoelectric device, a geophone, a hydrophone, a surface acoustic wave (SAW) device, or the output of an electronic mixing circuit. However, in the preferred embodiment, the transducer 20 is a microphone.

The input signal I(t) may be viewed as having two portions: a desired portion and an undesired portion. The desired portion may be a voice signal or an electrical data signal in a particular frequency band. The undesired portion may be characterized as having two portions: noise or other signals generated by industrial equipment or other interference sources outside the desired signal frequency band and background noise caused by environmental factors, such as wind, within the desired frequency band. For purposes of the present invention, coherent signals are predictable in the sense that the direction and magnitude of that signal may be reasonably extrapolated from its past behavior. Typically, the desired portions of an input signal are coherent signals. In a preferred embodiment, the desired, coherent signals are voice signals. Incoherent signals are random, rapidly-changing relative to the rate of change of coherent signals, and unpredictable. The in-band, background noise is incoherent. Because of its randomness, incoherent noise is difficult to characterize or isolate. As a result, traditional filtering techniques are ineffective at distinguishing and removing incoherent noise.

The analog electrical signal generated by the input transducer 20 is received by a signal processor 25 which essentially enhances and extracts the desired portion of the input signal. The isolated, undesired portion of the input signal is inverted and sent to a transducer compensator 30 which conditions the signal to compensate for the specific characteristics of the output transducer 35. The output transducer 35 can be, for example, a loudspeaker, headphone or other acoustic actuator, an electromechanical, electrohydraulic, piezoelectric or other vibration actuator, or an electronic mixing circuit. If the output transducer is a headphone, as it is in the preferred embodiment, the transducer compensator 30 compensates for the acoustic characteristics of the speakers in the headphones. Such a compensator 30 may be, for example, an LRC, single crossover, filter network for adjusting the impedance/inertia characteristics of the headphone speaker to a specific range of frequencies in the audible range.

The signal from the output transducer 35 signal combines with the original signal having both the desired and undesired portions. Because the output transducer signal is essentially the inverted waveform of the undesired signal portion, including the incoherent noise, the undesired portion is cancelled resulting in only the desired portion being present at a sensing device 40. For audio signals, the sensing device 40 may be the human ear. For other applications, the sensing device 40 may be an antenna, an amplifier, an analog-to-digital converter, etc. Because the signal enhancement and extraction process occurs so quickly relative to the speed of sound, the present invention does not require timing or synchronization of the cancelling signal with the input signal. Thus, the present invention effectively enhances and/or cancels signals in real time.

The signal detected by the transducer 20, which changes as a function of time, may be characterized mathematically as:

$$I(t)=S(t)+N_c(t)+B_i(t)$$

where

I(t) is the detected input signal;

S(t) is the desired signal in the frequency band of interest (in-band);

$N_c(t)$ is coherent and incoherent out-of-band noise; and $B_i(t)$ is incoherent background noise present in the frequency band of interest (in-band).

While it is probable that some in-band, coherent noise exists, in most applications such noise is either not a problem or may be removed using conventional methods.

As described earlier, the coherence of a signal is a measure of its predictability. Conversely, incoherence is a measure of signal unpredictability or randomness. Mathematically, coherence between two signals x and y may be defined as:

$$\beta^2_{xy}(f) = \frac{|G_{xy}(f)|^2}{|G_x(f)|\,|G_y(f)|} \leq 1$$

where $\beta_{xy}{}^2(f)$ is the coherence function of x and y. $G_x(f)$ is the power spectral density of the signal x; $G_y(f)$ is the power spectral density of the signal y; and $G_{xy}(f)$ is the cross power spectral density between the signals x and y. The power spectral density function describes the distribution of power versus frequency for a particular signal. Moreover, the power spectral densities of the signals x and y are the Fourier transforms of the autocorrelation functions of x and y, respectively. The cross power spectral density is the Fourier transform of the cross-correlation function of the signals x and y. Accordingly, the correlation functions are the corresponding operations in the time domain to the power spectral density functions in the frequency domain and are related via the Fourier transform.

The autocorrelation function of a signal describes the general dependence of the signal at one time on the signal at some other time. The mathematical representation of the autocorrelation function is $$R_x(\tau) = \lim_{T\to\infty} \frac{1}{T} \int_O^T x(t)x(t+\tau)dt$$

If a signal is uncorrelated over a time delay $\tau$, then the signal polarity over a period of time T is as likely to be positive as it is to be negative. Moreover, all amplitude values are equally likely to occur. The autocorrelation of an uncorrelated signal may be characterized as the area under a curve consisting of random positive and negative numbers. The probability of that area being zero is high because the positive and negative signals tend to cancel each other if the time interval is sufficiently long. Thus, as the time interval increases, the autocorrelation of an uncorrelated signal tends to increasingly attenuate that signal.

Figure 3:
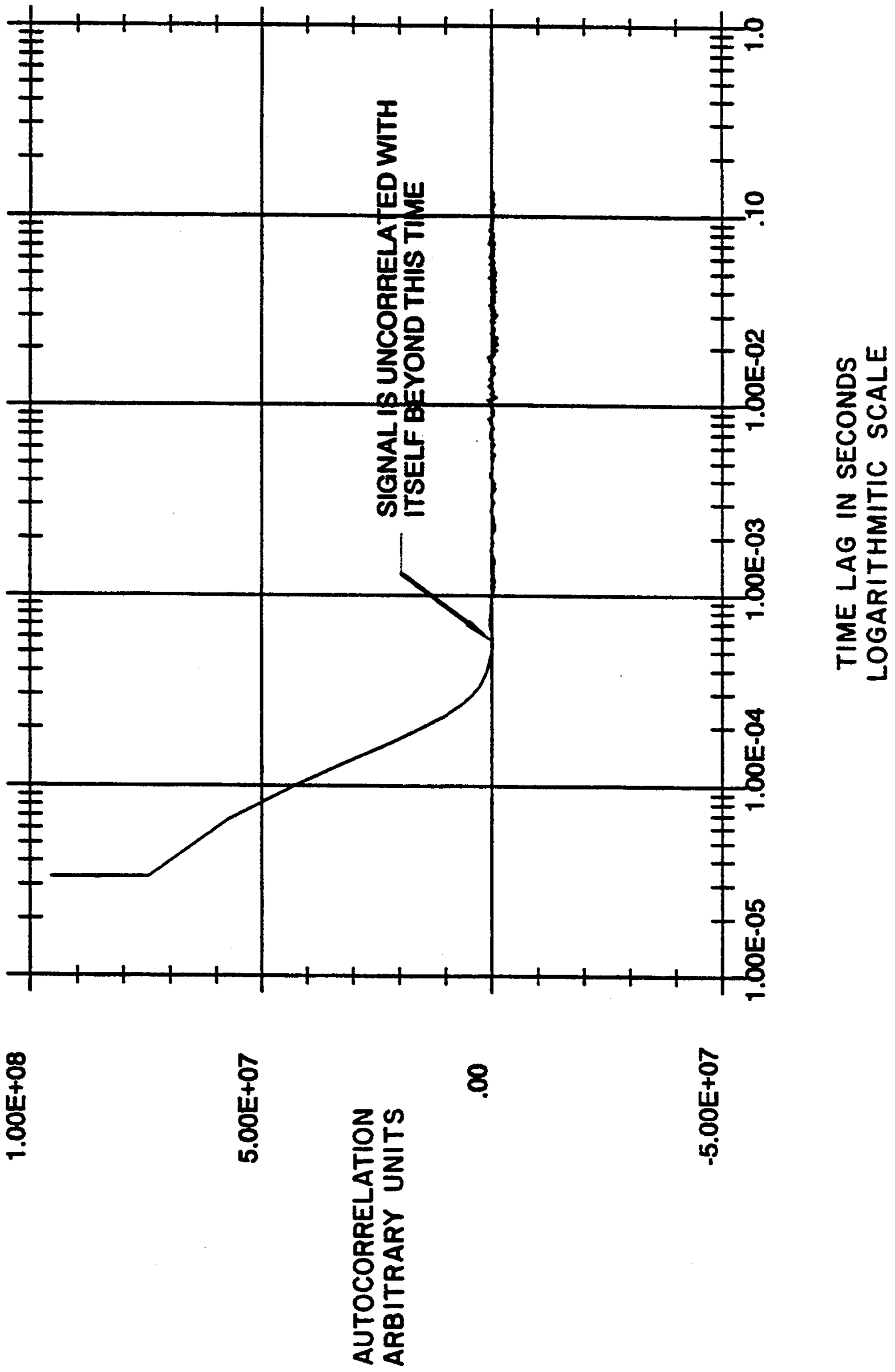
FIG. 3 is a graph illustrating an auto-correlation function of an environmental random noise signal.

FIG. 3 illustrates the autocorrelation of a random noise signal as a function of time delay interval $\tau$. As this noise signal is for purposes of illustration only, it will be recognized by those in the art that different random noise signals have different autocorrelation curves. As the time delay $\tau$ increases between the signal x(t) to the signal at some other point in time $x(t+\tau)$, the correlation decreases rapidly. For all $\tau$'s greater than 0.5 msec the autocorrelation is nearly zero. Thus, in this example, if the signal is delayed by 0.5 msec and added to the undelayed signal, the out-of-phase components of the incoherent signal effectively cancel. However, for a $\tau$ of 50 $\mu$sec or less, the autocorrelation of a random noise signal is non-zero. For $\tau$'s between $3.0\times10^{-5}$ sec and $0.5\times10^{-3}$ sec, the correlation steadily decreases. This results in a partial cancellation and an attenuation of the random noise signal.

The cross-correlation is defined in the same way except that the signal y(t) is substituted for either x(t) or $x(t+\tau)$. Correlation functions furnish measures of the similarity of a signal either with itself (in the case of autocorrelation) or with another signal (in the case of cross correlation) versus a relative time shift or delay $\tau$.

Since coherence is a function of power spectral density, and power spectral density and correlation are related by the Fourier transform, correlation and coherency may be considered functionally equivalent. Because the correlation function is less than one for non-zero time shifts, the incoherent portions of a signal are attenuated with much smaller time shifts than for coherent signals.

Figure 4:
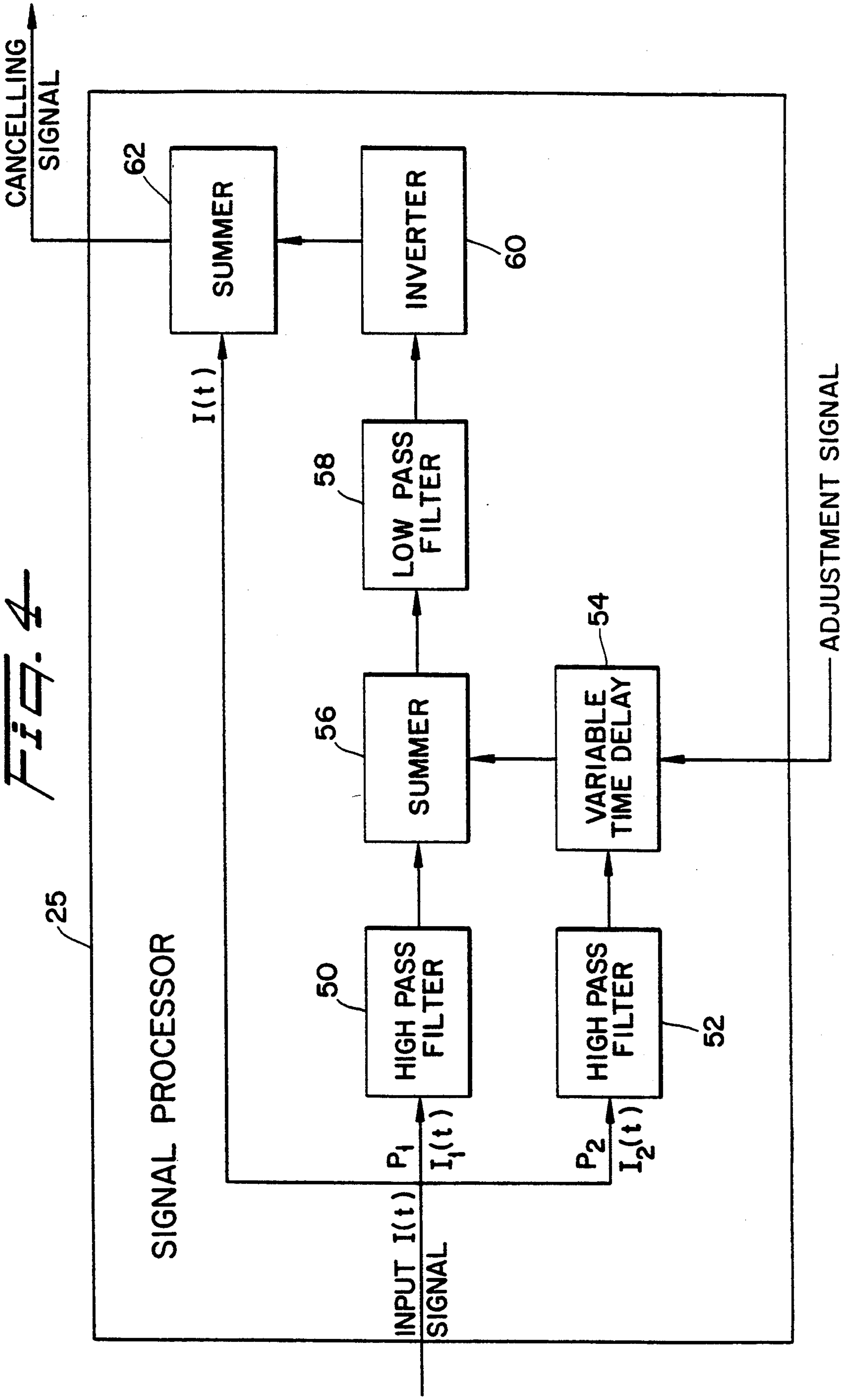
FIG. 4 is a more detailed functional schematic view of a signal enhancement processor of the system of the present invention.

Based upon the above relationships between coherence and correlation, the signal enhancement processor 25 will be described in conjunction with FIG. 4. As described above, the input signal I(t) received by the input transducer 20 has three components: the desired in-band signal S(t), the in-band, background noise $B_i(t)$, and the out-of-band noise $N_c(t)$. The input signal I(t) is connected to two parallel signal paths $P_1$ and $P_2$. In path $P_1$, the signal $I_1(t)$ is passed through a high pass filter 50 to remove the out-of-band noise component $N_C(t)$. The high pass filter 50 is used because typically most out-of-band noise generated by man-made sources, such as industrial machinery, trucks, etc., is coherent and concentrated at lower frequencies. However, those skilled in the art will recognize that many types of conventional filters may be used to remove both coherent and incoherent signals above or below the frequency band of interest. In the second signal path $P_2$, the signal $I_2(t)$ is filtered in a second high pass filter 52 and delayed by variable delay device 54 for a predetermined time delay $\tau$. An adjustment signal is used to increase or decrease the time delay T between $I_1(t)$ and $I_2(t)$ depending on the particular application and the type of incoherent signals to be removed. The signals from both of the signal paths $P_1$ and $P_2$ are correlated in a summer 56.

The summer 56 output O(t) may be represented mathematically as:

$$O(t)=S_1(t)+B_1(t)+S_2(t+\tau)+B_2(t+\tau)$$

If $\tau$ is sufficiently long, the incoherent background noise signals $B_1(t)$ and $B_2(t+\tau)$ tend to cancel themselves or at least attenuate the incoherent noise in-band B(t) for the reasons set forth above. If the time delay $\tau$ is too long, the desired, in-band signals $S_1(t)$ and $S_2(t)$ will no longer correlate resulting in attenuation of the desired signal. Nonetheless, the present invention takes advantage of the fact that because the desired, in-band signals are coherent, they correlate over much longer time periods than for incoherent signals. The time delay is carefully selected depending on the application, e.g., empirically, to be short enough that the coherent signal remains correlated and intelligible but long enough to achieve significant attenuation of incoherent noise signals. Thus, the present invention enhances the desired signal by reducing the incoherent, in-band, background signals without adversely affecting the desired, coherent signal.

To explain another signal enhancement feature of the present invention, a coherent signal detected by the input transducer is assumed to be a single frequency sinusoid sin(wt). At the output of the summer 56:

$$O(t) = \sin(wt) + \sin(w(t-\tau)) \quad (1)$$

$$= \sin(wt) + \sin(wt)\cos(w\tau) - \cos(wt)\sin(w\tau) \quad (2)$$

$$= \sin(wt)(1+\cos(w\tau)) - \cos(wt)\sin(w\tau) \quad (3)$$

$$2\sin(wt)\cos^2\left(\frac{w\tau}{2}\right) - \cos(wt)\sin(w\tau) \quad (4)$$

Analysis of Equation (4) demonstrates two additional advantages achieved by the present invention. First, the amplitude of the summer output signal O(t) is twice that of the coherent input amplitude of the signal reduced by the constant $$\cos^2\left(\frac{w\tau}{2}\right)$$

term. Thus, for small $\tau$'s, the gain of the coherent signal is increased by nearly a factor of two. A second advantage is the product of a constant $\sin(w\tau)$ and the quadrature of the input signal cos(wt) generates an echo or reverberation of the coherent, input signal sin(wt). Reverberation enhances the signal clarity. For example, audible signals sound richer or fuller to the human ear when such reverberation is present.

In theory, the autocorrelation of an incoherent signal approaches zero as the time delay $\tau$ increases, as described above. In practice, several factors limit the duration of $\tau$. For example, as $\tau$ increases, the autocorrelation of the coherent, desired signal decreases. With decreasing correlation, the desired signal gain is reduced. Not only does an increased time delay decrease the signal gain, but the signal quality as well. For applications relating to audible signals, increasing the time delay decreases the intelligibility of voice and data signals. In some instances, even small losses in intelligibility can not be tolerated. Moreover, after a certain time delay, the signal enhancement characteristic or reverberation referred to above is lost.

Recognizing that there are tradeoffs in selecting a long time delay $\tau$ to eliminate incoherent noise and achieving signal gain, intelligibility, or enhancement of the desired signal, the present invention provides extensive flexibility in the time delay selection by allowing for the removal of any residual, incoherent noise. Residual noise is defined as the incoherent, random noise signals that have not cancelled in the delay and sum procedure of the present invention either because the time delay $\tau$ was too short or because of imperfections in the system. As will be described further below, the present invention causes the residual signals to be shifted up and out of the desired frequency band. The coherent, desired signals, while shifted slightly higher in frequency, nonetheless remain in the desired frequency band. Accordingly, as shown in FIG. 4, a low pass filter 58 removes the high frequency shifted residual noise components, leaving the desired signal in-band. Of course, the low pass filter may be any conventional filter designed or tuned to pass only those frequency components below the upper end of the desired frequency band.

The output signal from the low pass filter 58 is inverted by an inverter 60. The inverted signal is summed with the input signal from the input transducer 20 in a summer 62. The summer 62 output signal, defined as the cancelling signal, contains all of the components of the input signal except the desired, in-band signal. The cancelling signal is processed by the transducer compensator 30 before driving the output transducer 35 to cancel the undesired signal portion at the sensing device 40.

For certain values of $\tau$ and certain noise spectra, the process of shifting the input signal I(t) by a time delay $\tau$ and summing it with the unshifted input signal generates a time derivative of the input signal. The derivative of $$I(t), \frac{d[I(t)]}{dt},$$

approximated as $$\frac{I(t_1) - I(t_2)}{t_1 - t_2}.$$

If $\tau$ is the time difference $(t_1 - t_2)$, then the change or difference in I(t) over $\tau$ is the derivative of I(t). In the frequency domain, a time derivative corresponds to a shift in frequency.

As described earlier, coherent signals are predictable, and because of the nature of that predictability, changes of the signal can be extrapolated. Incoherent signals, on the other hand, are random and unpredictable. For small time increments, the rate of change of an erratic signal such as incoherent noise is very high compared to that of coherent signals. If a time derivative is an index representing the rate of change of a given signal, the incoherent signals have a high index and coherent signals have a low index.

In terms of frequency, the Fourier transform of the time derivative $$\frac{d[f(t)]}{dt}$$

is wF(w). Multiplying one changing signal by another changing signal is essentially a modulation of the one signal by the other. If a signal at a low frequency is multiplied by another higher frequency signal, the lower frequency signal modulates the high frequency signal. Such a modulation effectively shifts the lower frequency signal up to the high frequency. The term w, which can be viewed as representative of the magnitude of the rate of change index, is relatively small for coherent signals when compared with that of the incoherent signals. As a result, the coherent signals are only shifted in frequency by a relatively small amount. However, the incoherent noise signals are shifted by a large amount. By tuning the time delay $\tau$ for each specific application, the time derivative effect of the present invention shifts the residual, incoherent noise signals out of the frequency band of interest.

The present invention generates a cancelling signal by isolating the desired signal in a desired frequency band and removing this isolated signal from the originally received input signal. By way of comparison, conventional systems extract a band limited region of a broadband signal simply by using a bandpass filter. In order to construct a cancelling signal, the output signal of the bandpass filter is inverted and combined with the input signal. The problem with this conventional approach is that the phase of the band pass filter output signal is not coherent with the in-band components of the originally received input signal which are to be removed. When the inverted filter output signal is summed with the input signal, this lack of phase coherence distorts the cancelling signal. The present invention resolves this problem by first high pass filtering the input signal. The phase of the high pass filter output signal is coherent with the phase of the input signal frequency components above the high pass filter cutoff frequency to some higher frequency beyond the bandpass region of interest. At this higher frequency, phase distortion is removed subsequently by means of the low pass filter whose cutoff frequency corresponds to the upper frequency limit of interest.

Phase distortions in the present invention occur primarily below the cutoff frequency of the high pass filters and above the cutoff frequency of the low pass filter. Those residual low and high frequency signals outside the bandpass region are attenuated significantly, typically by 40-60 dB. When the residual signals are combined with the original signal, only minimal phase distortion is introduced. In ordinary circumstances, this distortion level is not discernible. Thus, the present invention coherently removes the desired, in-band signal from the input signal and maintains the phase coherence of the cancelling signal.

Figure 5:
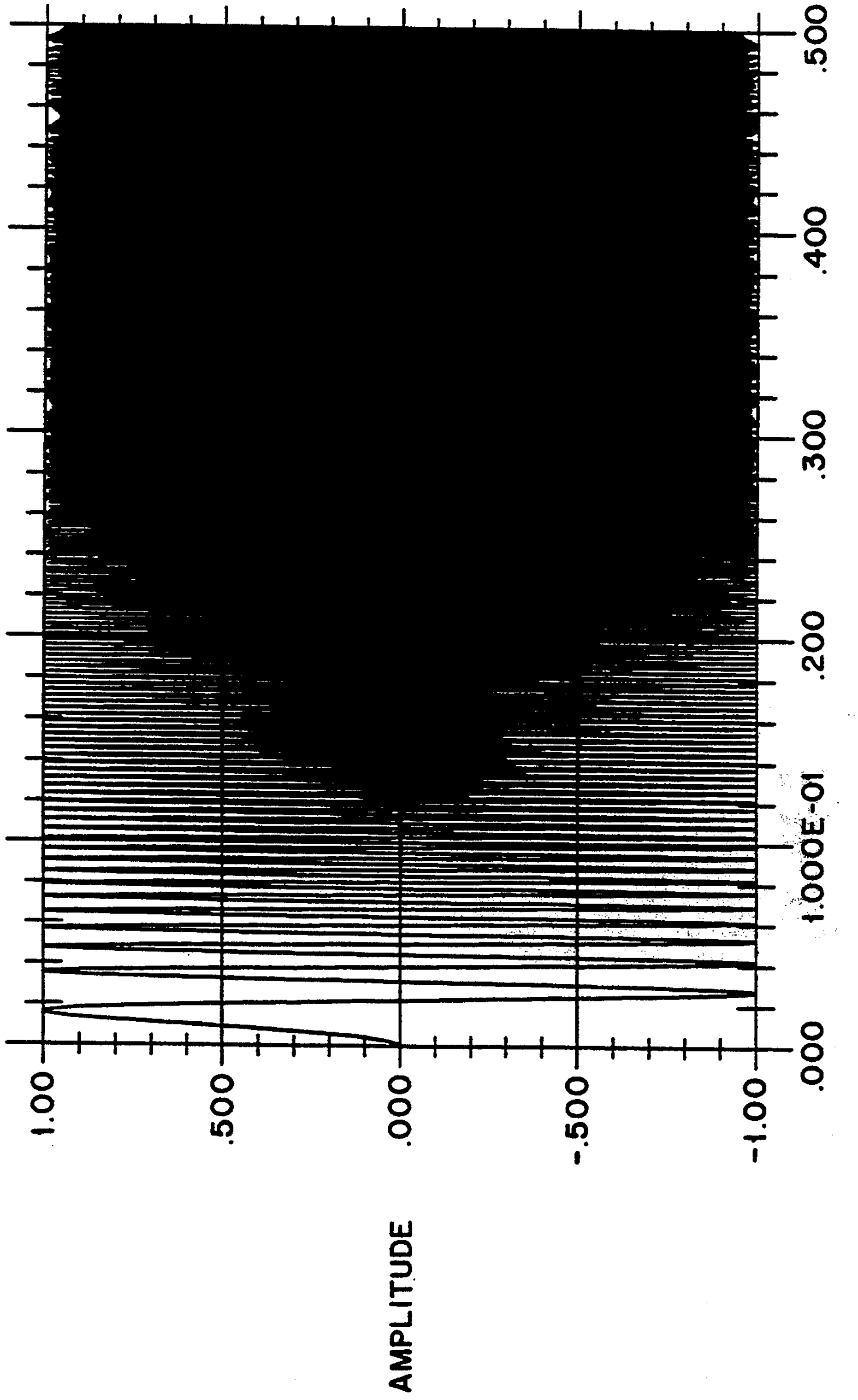
FIG. 5 is a graph illustrating a linear FM signal.

A graphical illustration of the signal enhancement process is presented in conjunction with FIGS. 5-13. In FIG. 5, a desired signal is simulated as a chirped sine wave. This signal is also known as a linear frequency modulated (FM) signal. A chirped sine wave has a broad band response typical of a voice signal as well as a time varying spectrum. Its frequency content varies linearly from 500 to 1000 Hz over a duration of 0.5 seconds. Specifically:

$$S(t) = \sin(2\pi ft)$$

$$f = f_1 + \frac{(f_2 - f_1)}{\Delta t}\, t$$

where $f_1$ and $f_2$ are 500 Hz and 1000 Hz respectively and t is 0.5 seconds.

Figure 6:
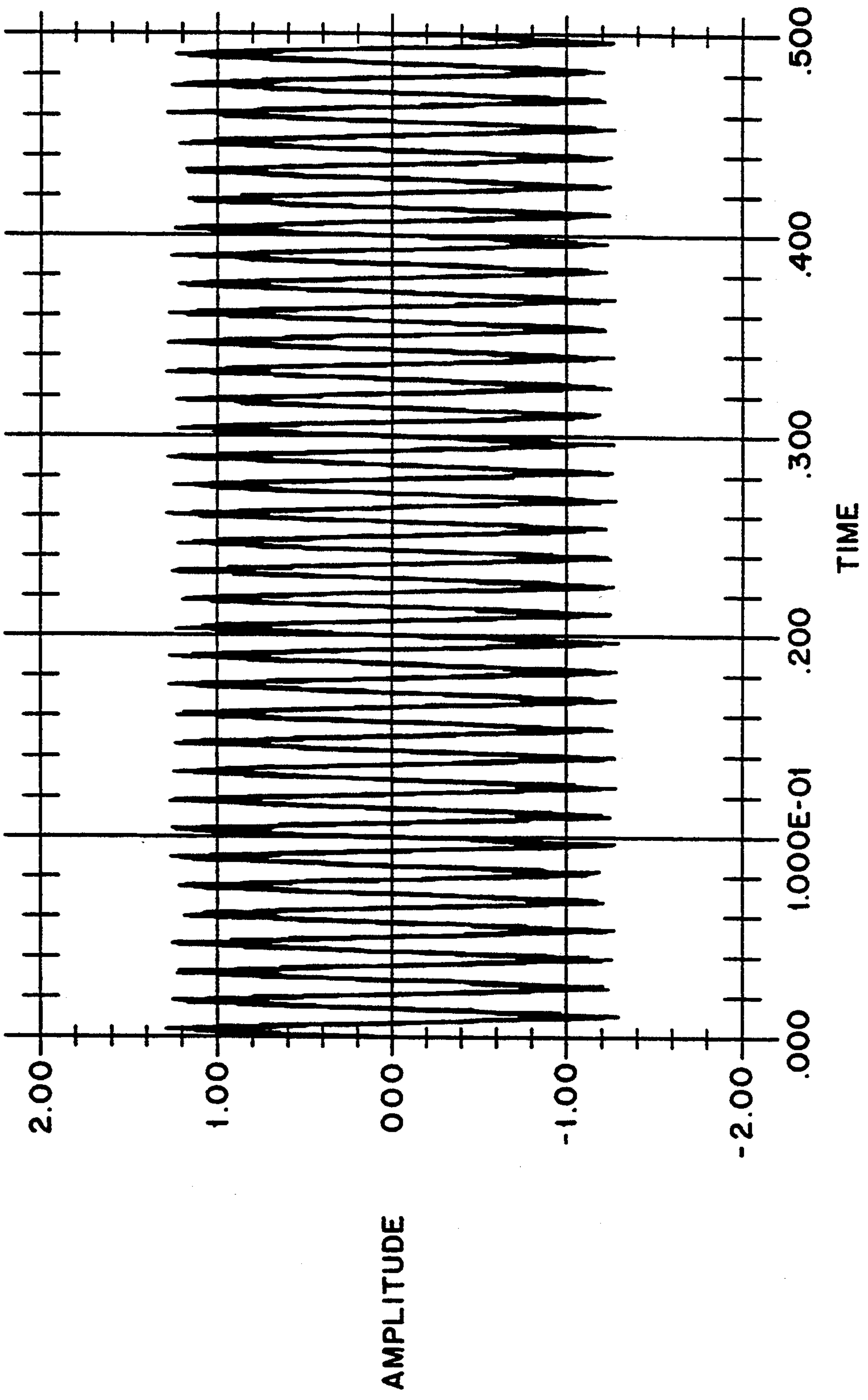
FIG. 6 is a graph illustrating a 70 Hz background signal with random noise.

In FIG. 6, a low frequency (70 Hz) unit amplitude, coherent noise signal has been combined with a random, white noise source. The white noise has a maximum amplitude of 0.3 units relative to the low frequency signal. The combined signal, labelled the background signal, represents an undesired noise signal having out-of-band components and in-band, incoherent components of the same amplitude as the desired signal shown in FIG. 5.

Figure 7:
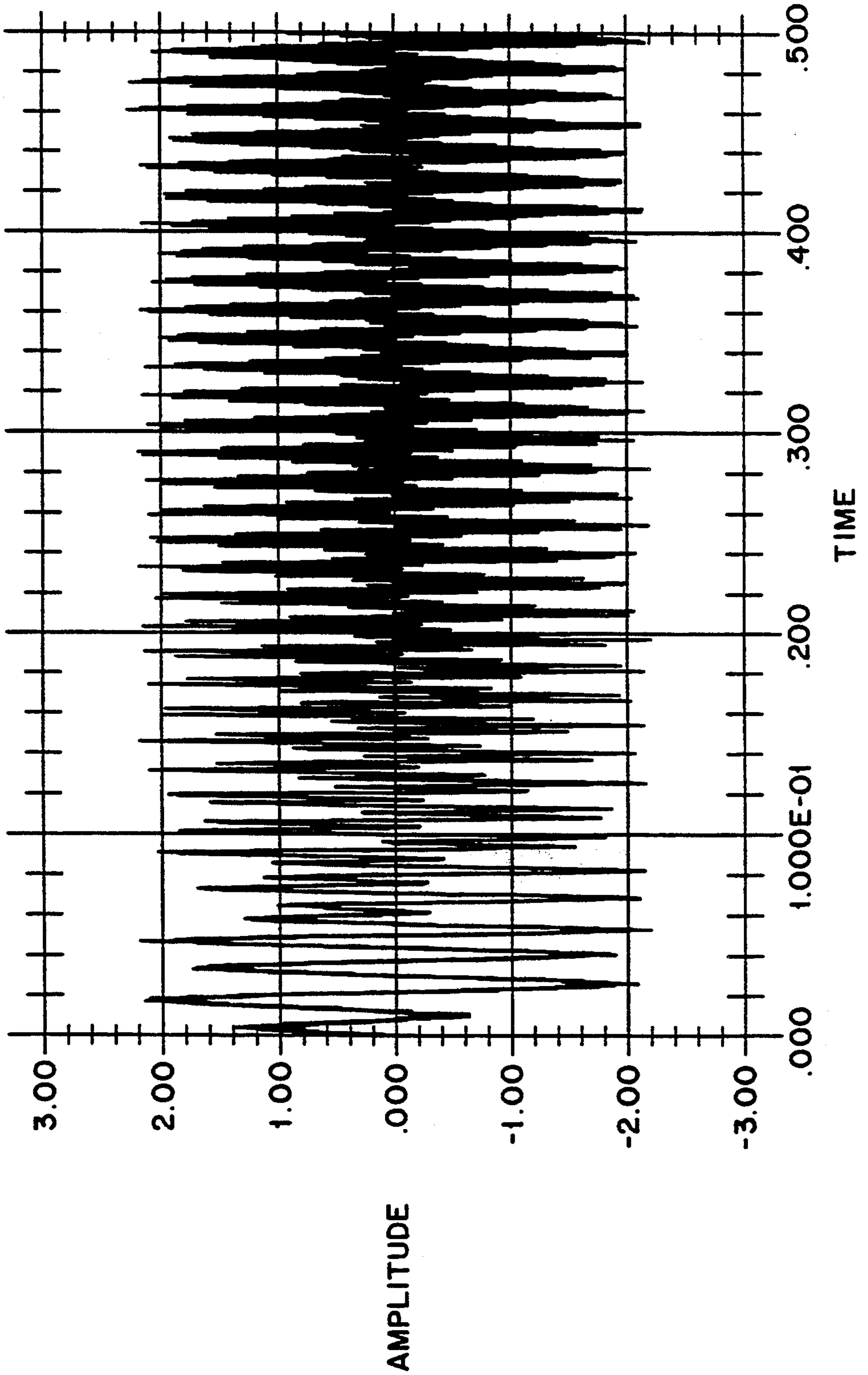
FIG. 7 is a graph illustrating an input signal formed from the summation of the signals illustrated in FIGS. 5 and 6.
Figure 8:
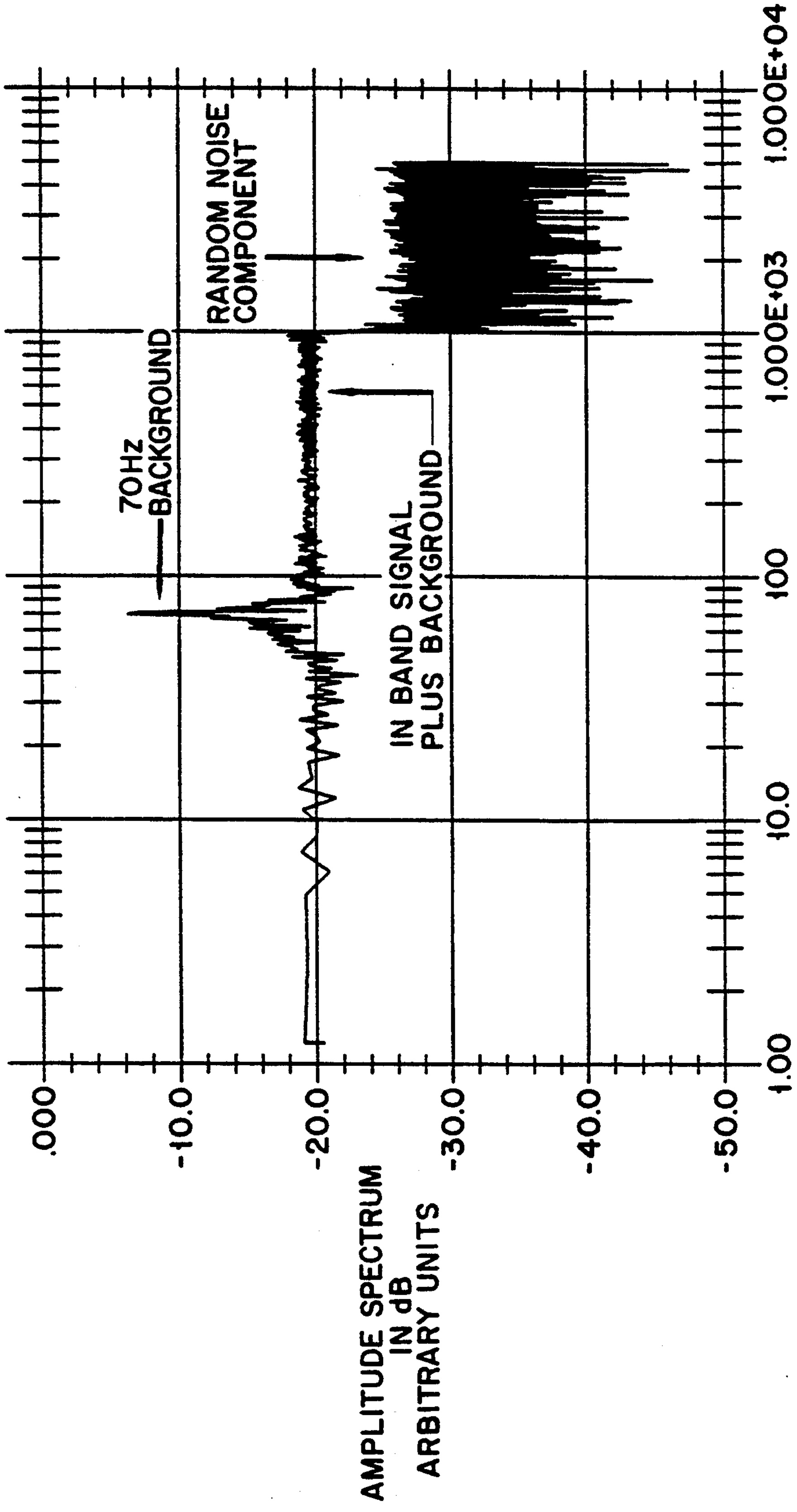
FIG. 8 is a graph illustrating the Fourier Transform of the input signal.

FIG. 7 graphically depicts the linear sum of the desired signal and the background noise signal. As such, that signal is the input signal I(t) detected by the input transducer 20. FIG. 8 shows graphically the Fourier transform of the input signal I(t). The signal peak at 70 Hz represents the signal energy of the low frequency portion of the background shown in FIG. 6. The steady amplitude signal between 500 Hz and 1000 Hz represents the desired signal, i.e., the chirped sine wave shown in FIG. 5, in the voice frequency band. The out-of-band signals above 1000 Hz represent the broadband random, incoherent signals added to the 70 Hz noise in FIG. 6.

Figure 9:
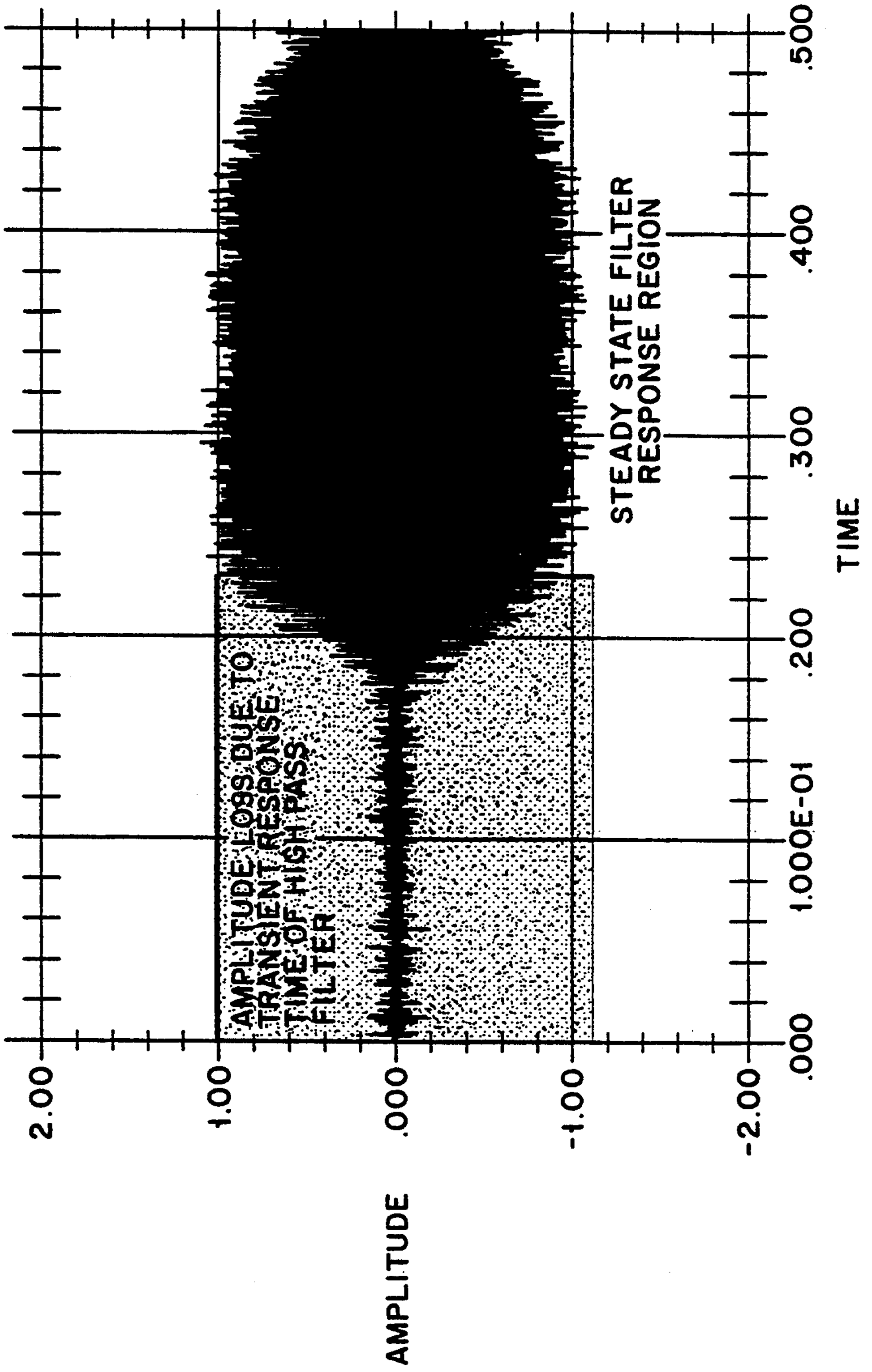
FIG. 9 is a graph illustrating the input signal after summation of the high pass filter output signals.

FIG. 9 illustrates the output O(t) after high pass filtering, delay, and summation. The initial, low amplitude portion of the waveform occurs because the initial portion of the chirped sinusoid was removed by the high pass filters 50 and 52.

Figure 10:
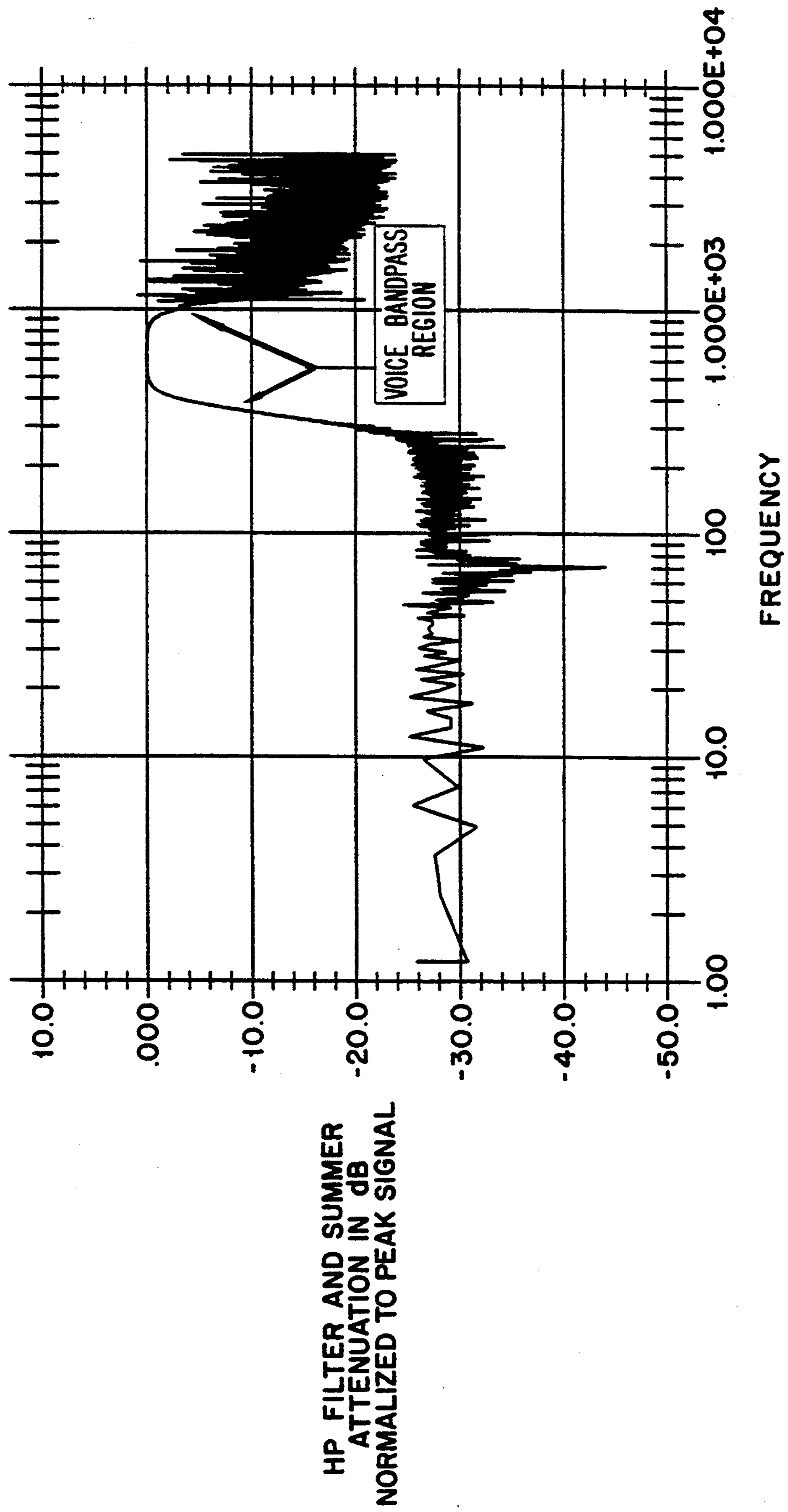
FIG. 10 is a graph illustrating the Fourier Transforms of the input signal and the low pass filter output signal.

FIG. 10 illustrates the Fourier Transform of the transfer function defined by the input signal from FIG. 7 and the output signal from FIG. 9. The signal waveform presents the gain of the present invention as a function of frequency in terms of the signal to signal plus background ratio. The desired frequency band for this example is that of the voice band from approximately 400 Hz to 1000 Hz. Signals below the desired band at 400 Hz are attenuated by 30 dB, and signals above the desired band at 1000 Hz are attenuated by 10–20 dB.

Figure 11:
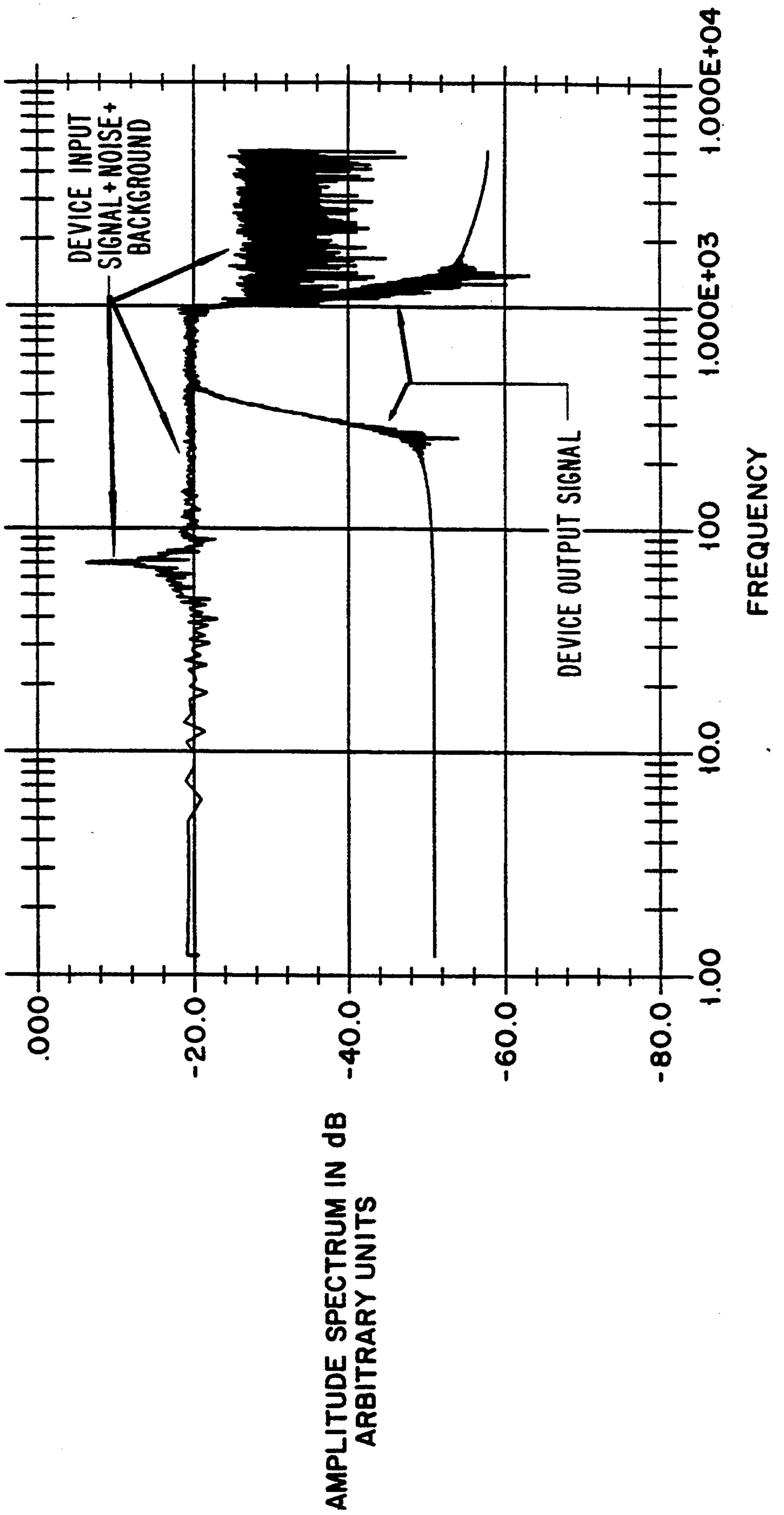
FIG. 11 is a graph illustrating the amplitude gain of a signal enhanced according to the present invention.

FIG. 11 contrasts the Fourier transform of the input signal with that of the output signal. The pass band (400–1000 Hz) of the desired signal is clearly preserved with both the low and high frequency content of the background signal attenuated. All of the undesired signal or noise portions of the input signal are shown below about 400 Hz and above 1000 Hz. In the output signal Fourier transform (the lower curve), the low frequency noise is attenuated 30 dB below the input signal Fourier transform (the top curve), and the incoherent noise shifted out-of-band is attenuated 20 dB below the input signal Fourier transform. The desired signals within the 400 Hz–1000 Hz band are relatively unchanged. However, the in-band, signal-to-noise gain cannot be seen on the scale of the graph of FIG. 11 because it is approximately 2–3 dB which is the width of the signal trace.

Figure 12:
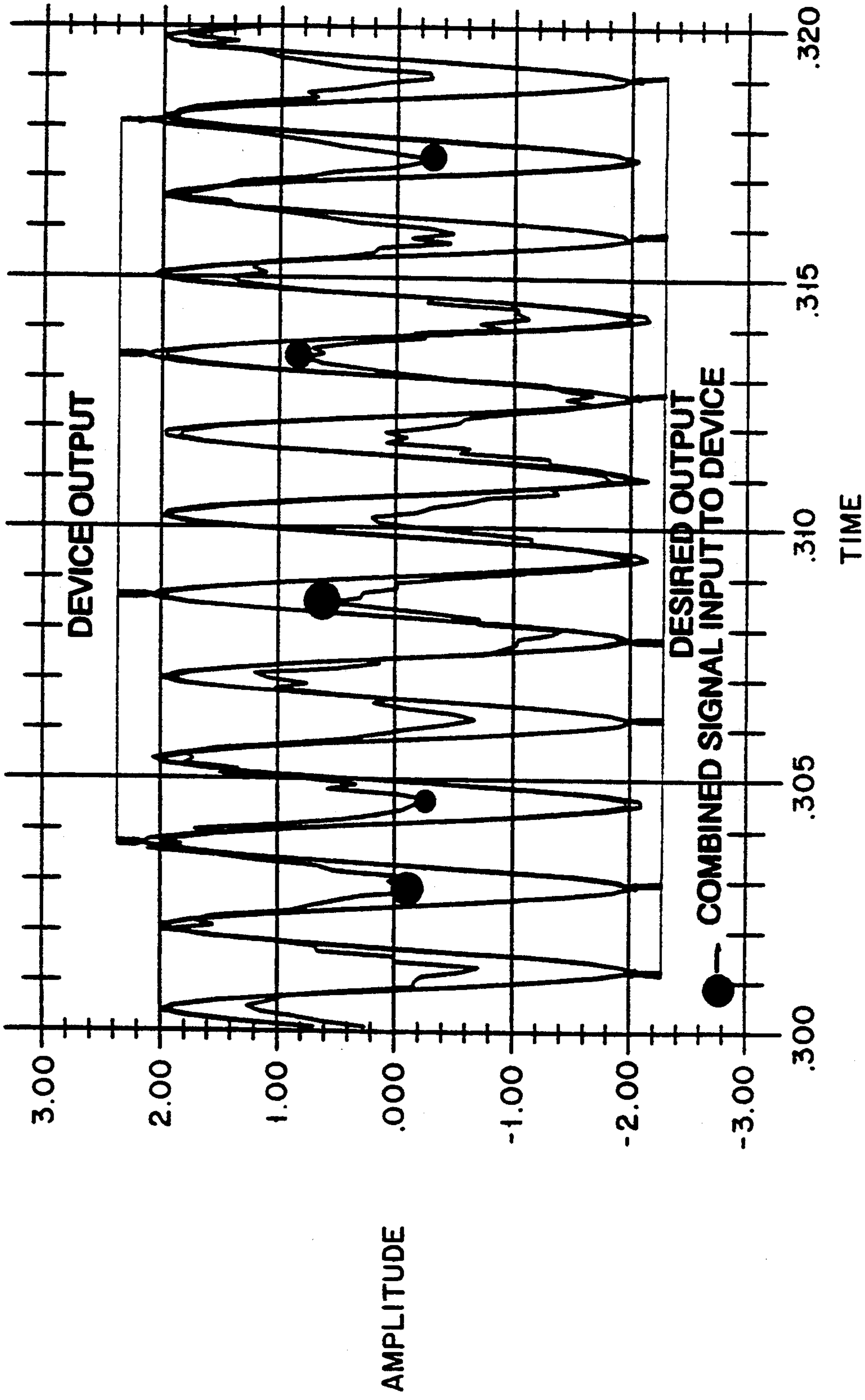
FIG. 12 is a graph illustrating the input signal, and the output signal.

The time domain waveforms of the input signal, the desired system output signal, and the actual system output signal at the output transducer 35 are illustrated in FIG. 12. The desired and actual system output signals are the steady amplitude traces, and the input signal is the lower amplitude, modulated trace. As is apparent from these waveforms, the present invention allows for almost a complete recovery of the desired input signal.

Figure 13:
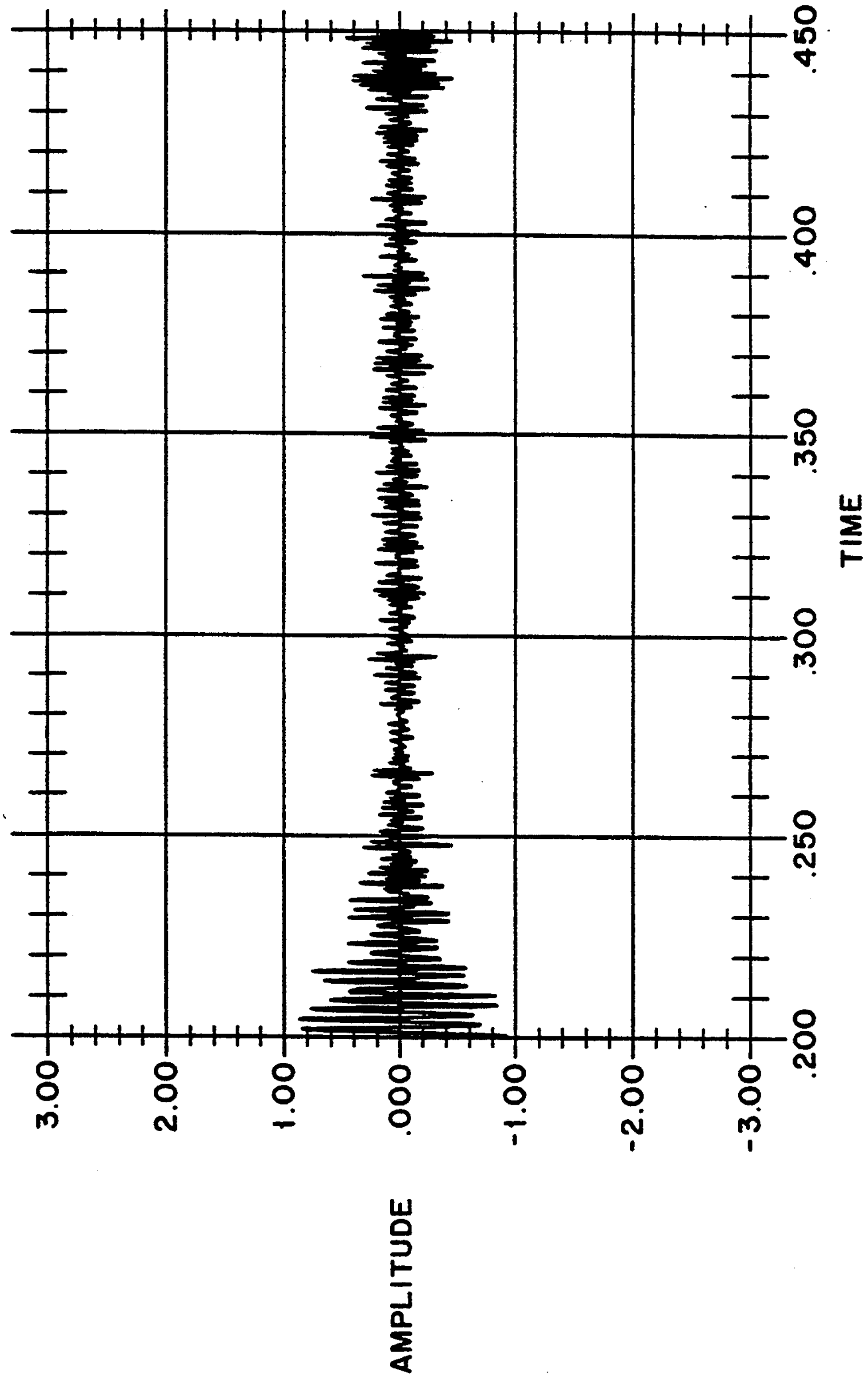
FIG. 13 is a graph illustrating a difference between the desired signal shown in FIG. 5 and the output signal of the output transducer 35.

In order to better illustrate the capabilities of the present invention, FIG. 13 displays the difference between the actual system output signal and the desired output signal. The difference signal has peak amplitudes on the order of 0.2 or a factor of 10 below the input signal, which has been summed by the device and is twice the input amplitude. This represents an in-band error of −10 dB in amplitude or −20 dB in power.

From this example, the present invention has been shown capable of isolating and enhancing a broad band, desired signal from an input signal corrupted by a coherent noise signal of comparable amplitude which includes incoherent, random noise. The delay and sum procedure of the present invention eliminates incoherent, random noise within the frequency band of interest by exploiting the different effects of the autocorrelation and the time derivative functions on coherent signals and incoherent signals. With careful manipulation of the time delay $\tau$, the present invention cancels a significant portion of the incoherent signals in the frequency band of interest so that residual high frequency signal components are readily removed with a low pass filter. In addition to the novel filtering feature, the delay and sum procedure of the present invention enhances coherent in-band signals by providing increased signal gain and by introducing a reverberation characteristic. Thus, the quantity and quality of the desired signals are both significantly improved.

Because the present invention is capable of enhancing a signal in real time, one area of application relates to the modification or cancellation of such signals as acoustic noise or vibration. Other applications could include: cancellation of electrical line noise and RF noise, monitoring of a known signal to detect abnormalities that might be caused by the presence of secondary or external sources so that alarms and warning signals could be triggered, and modification or some combined cancellation and modification of a signal in order to change the character of the residual error signal.

The signal enhancement qualities of the present invention specifically allow random, incoherent signals to be isolated and therefore removed in real time. Premodelling of incoherent noise signals is not required, allowing for a flexibility and adaptability in a wide range of applications. In addition, the timing or pulse generators, and the synchronization procedures used in the prior art systems to synchronize the generation of the premodelled signal with the sensed signal are completely unnecessary.

The invention has been described in terms of preferred embodiments to facilitate understanding. The above embodiments, however, are illustrative rather than limitative. It will be readily apparent to one of ordinary skill in the art that departures may be made from the specific embodiments shown above without departing from the essential spirit and scope of the invention. Therefore, the invention should not be regarded as being limited to the above examples, but should be regarded instead as being fully commensurate in scope with the following claims.

We claim:

1. A system for enhancing a detected signal having desired and undesired portions, comprising:

first and second parallel filtering means, receiving said detected signal, for removing signals outside of a desired frequency band, said desired portion being substantially within said band, and for generating first and second filtered signals, respectively;

time delay means, connected to said second filtering means, for delaying said second filtered signal by a predetermined time delay to generate a time delayed signal;

summing means, connected to said first filtering means and said time delay means, for summing said first filtered signal and said time delayed signal, wherein said desired portion is enhanced and said undesired portion is attenuated; and third filtering means for filtering an output signal from said summing means to remove signals above said desired frequency band.

2. The system according to claim 1, wherein said summing means combines said first filtered signal and said time delayed signal to increase a gain of said desired signal and to enhance signal quality of said desired signal by adding a reverberation characteristic.

3. The system according to claim 1, wherein said first and second filtering means are high pass filters for removing low frequency components of said undesired portion and said third filtering means is a low pass filter.

4. The system according to claim 1, wherein said output signal of said third filtering means includes coherent signals within said voice frequency band, said third filtering means removing incoherent signals within said voice frequency band and coherent signals outside of said voice frequency band.

5. The system according to claim 1, wherein said time delay means is variably adjustable.

6. The system according to claim 1, further comprising:

inversion means, connected to said third filtering means, for inverting an output signal from said third filtering means;

combining means for combining said detected signal with said inverted signal to generate an opposing signal;

compensating means for adaptively inverting said opposing signal; and transducer means, connected to said compensating means, for generating a cancellation signal, wherein said cancellation signal cancels said undesired portion of said detected signal.

7. A system for enhancing a detected signal having coherent and incoherent components, comprising:

first and second filtering means for filtering said coherent and incoherent signal components outside of a desired frequency band; and means for removing said incoherent components inside of said frequency band, said removing means further including enhancement means for attenuating said incoherent signals to a residual signal; and a low pass filter for removing said residual signal.

8. The system according to claim 7, wherein said filtering means includes first and second parallel, high pass filtering means for removing signals below said desired frequency band, and for generating first and second filtered signals, respectively, and wherein said enhancement means includes:

time delay means, connected to said second filtering means, for delaying said second filtered signal by a predetermined time delay to generate a time delayed signal, and summing means, connected to said first filtering means and said time delay means, for summing said first filtered signal and said time delayed signal.

9. A system according to claim 8, wherein said means for removing includes means for isolating and increasing the magnitude and quality of said coherent components within said frequency band.

10. A system for isolating an undesired portion of a detected signal in order to actively cancel said undesired portion from a desired portion of said detected signal, comprising:

a signal processor having analog signal processing components which include:

first and second parallel filtering means, receiving said detected signal, for removing signals outside of a desired frequency band, said desired portion being substantially within said band, and for generating first and second filtered signals, respectively;

time delay means, connected to said second filtering means, for delaying said second filtered signal by a predetermined time delay to generate a time delayed signal; and summing means, connected to said first filtering means and said time delay means, for summing said first filtered signal and said time delayed signal;

isolation means for receiving a signal from said signal processor for isolating said undesired portion;

inversion means for inverting said isolated signal; and transducer means, connected to said inversion means, for generating a cancellation signal, said cancellation signal cancelling said undesired portion of said detected signal.

11. A system according to claim 10, wherein said signal processor increases the magnitude and quality of said coherent components within said frequency band.

12. The system according to claim 10, wherein said time delay means is variably adjustable.

13. The system according to claim 10, further comprising:

third filtering means for filtering an output signal from said summing means to remove signals above said desired frequency band.

14. The system according to claim 13, wherein said first and second filtering means are high pass filters for removing low frequency components of said undesired portion and said third filtering means is a low pass filter.

15. The system according to claim 10, wherein said desired frequency band is the voice frequency band, said desired portion includes coherent signals within said voice frequency band, and said undesired portion includes incoherent signals within said voice frequency band and coherent signals outside of said voice frequency band.

16. The system according to claim 15, wherein said signal processor removes said incoherent signals and adds an enhancing signal to said desired portion, whereby the quality of said desired portion is improved.

17. The system according to claim 13, wherein said isolation means includes:

compensation means, connected to said third filtering means, for inverting an output signal from said third filtering means, and combining means for combining said detected signal with said inverted signal to generate said isolated signal.

* * * * *